United States Patent [19]

Goldammer

[11] 4,253,567
[45] Mar. 3, 1981

[54] CASSETTE CONTAINER

[75] Inventor: Arthur R. Goldammer, San Pedro, Calif.

[73] Assignee: Pocket-Pak, Inc., Tulsa, Okla.

[21] Appl. No.: 959,708

[22] Filed: Nov. 13, 1978

[51] Int. Cl.³ .................................. B65D 85/672
[52] U.S. Cl. ............................................ 206/387
[58] Field of Search ............ 206/387, 472, 473, 482, 206/493, 485; 312/108, 111, 347; 281/29, 31

[56] References Cited

U.S. PATENT DOCUMENTS

| | | | |
|---|---|---|---|
| 3,604,556 | 9/1971 | Schwartz | 206/387 |
| 3,620,361 | 11/1971 | Fugiwara et al. | 206/387 |
| 3,664,492 | 5/1972 | Wallace | 206/387 |
| 3,743,081 | 7/1973 | Roberg et al. | 206/387 |
| 3,829,132 | 8/1974 | Willieme | 206/387 X |
| 3,866,751 | 2/1975 | Holert | 206/387 |
| 4,022,322 | 5/1977 | Louzil | 206/387 |

*Primary Examiner*—Joseph Man-Fu Moy
*Attorney, Agent, or Firm*—Head & Johnson

[57] ABSTRACT

A container for holding a plurality of cassettes in a stored environment such as an album. Each container is comprised of a flat wall portion, side walls, and a single end wall together with a preformed top wall. The cassette is inserted between the top wall and the bottom wall from an end portion. The top wall has a center portion displaced from the bottom wall a given amount sufficient to allow the cassette to enter freely. The bottom wall is substantially flat whereas opposing end portions of the top wall are spaced a greater distance from the bottom wall in the center portion and a distance sufficient to clear the extended flanges on the cassette that are in close proximity to the head portion. The pair of spaced-apart end portions on the top wall allow the cassette to be inserted in either direction and without restriction. An indentation located on the center line of the top wall and shaped in the form of an ellipse is located so as to fall within the wind or rewind gears of the cassette when located within the container. The elliptical portion of the indentation does not completely fill the hole of the wind or the rewind gear but only a portion of the opening and is the sole means of holding the cassette in the container.

13 Claims, 7 Drawing Figures

CASSETTE CONTAINER

This invention relates to a container for storing cassettes and more particularly to a preformed plurality of containers, each adapted to accept a cassette regardless of whether the head portion is pointed up or down.

The electrical recording art has developed from utilizing straight records or platters to using reel to reel recorders and now to utilizing cassettes which are in effect a preformed reel to reel tape recorder located in a handy package.

The advantages of utilizing cassettes are obvious in that the threading of tape necessary in the reel to reel recorder is obviated and as a result the tape is never touched by human hands but is always maintained in a protected atmosphere, thereby ensuring long life of the tape product. In addition the cassette becomes a handy tool for the user and as a result has gained wide prominence for both the professional recorder and the amateur recorder.

In the recording industry the cassette is usually adapted to run at 1⅞" per second and depending on the size of the tape it is possible to obtain a given length of tape running from 15 minutes to 45 minutes and even 60 minutes.

Because of the ease of utilizing the cassette, it is now possible to obtain complete albums of recorded history, language instruction and general course instruction in most any course that one desires. The manufacturer in supplying such courses usually provides the complete course in a number of tapes that may vary from 2 to 8 or even more tapes in a given course of instruction.

The problem facing the industry has been to provide a convenient container for holding a plurality of cassettes that would allow the user to find the cassette, remove it from the container, and provide a receptacle for accepting the cassette after the tape has been used.

The problem, unfortunately, is complicated by the fact that the cassette is not symmetrical but rather contains a head portion being outwardly extending flanges on each side of the head portion but does not otherwise contain any extending flanges on the opposite side of the cassette.

In addition, the cassette contains a wind and rewind gear and sufficient tape to be wound from the rewound gear around the head portion and back to the rewind gear. The problem that exists is the fact that the gear portions, namely the wind and rewind gear, are not located on the center line of the cassette but rather are located off the center and further away from the head side of the cassette having the outwardly extending flanges.

A review of the prior art will show that the most successful storage case for a single tape cartridge or cassette is disclosed in U.S. Pat. No. 3,272,325 issued to J. J. M. Schoenmakers on Sept. 13, 1966. This patent discloses a device for accepting a single cassette in a nesting relationship and then provides a second cover that completely encompasses the cassette so as to maintain the cassette in a dust free atmosphere and in a rigid protected position. Unfortunately the Schoenmakers device is not adaptable to holding more than one cassette as is so necessary in the art today. The Schoenmakers patent does disclose a most exemplary model for holding only a single cassette and for those situations requiring protection for only a single cassette it is probably the most successful of all cassette holders.

In the art of providing storage for a plurality of cassettes, the most successful storage cavity technique is that disclosed by Stembel in U.S. Pat. No. 3,620,367. Up to the present time the Stembel patent has been the most successful technique for storing a plurality of cassettes. Stembel discloses an open container in which the individual cassette is laid in place in a suitable receptacle. The receptacle includes projections for engaging the wind and rewind gears and also contains projections on the bottommost plate that act as fulcrum points to thereby allow the cassette to be removed by pressing on the cassette on one end or the other to thereby pivot the cassette about a fulcrum point to allow the user to grab the raised end and thereby remove the cassette from the container.

The Stembel device has received wide acceptance from industry but unfortunately it does suffer from certain defects that have delayed the progress of the art. For example, the cassette must be located in the Stembel container in a preferred direction only and cannot be placed in the container as desired by the user. The projections that are forced into the wind and rewind gears being offset to accommodate the location of the wind and rewind gears prevent the cassette from being placed in any position but the preferred position which is in a given direction.

In addition, the flat packaging used by Stembel allows the complete top portion of all the cassettes to be available to the atmosphere and thereby places each of the cassettes in an unprotected atmosphere. Stembel uses indents of different kinds to frictionally engage the cassette so as to prevent the cassette from being unintentionally removed from the container.

In the present invention there is described a novel container adapted to hold a plurality of cassettes in a protected environment that protects substantially the complete cassette from the outside atmosphere. The container also allows the user to insert the cassette in any position or direction and hence does not have a predetermined or preformed position, making the container more functional and easy to use by the ultimate consumer. The container accepts the cassette and contains a single indentation adapted to mesh with a portion of either the wind or rewind gear to hold the cassette into the inserted position regardless of how the cassette is inserted by the user.

The present invention discloses a cassette holder capable of cooperating with a cassette having an outwardly extending flange on each of the end walls and having a pair of spaced wind and rewind gears that are not located on the centermost portion of the cassette. The holder utilizes a substantially flat bottom wall, identical side walls, a single end wall, and a preformed top wall. The top wall has a center portion spaced a given distance from the bottom wall in order to accept the body of the cassette. The end portions of the top wall are each spaced a greater distance from the bottom wall than the center portion in order to accept the outwardly extending flanges on the cassette.

An indentation is located on the center line of the top wall and is adapted to project inwards towards the bottom wall for contacting a portion of the wind or rewind gear opening on the cassette. The indentation locks the cassette in the container regardless of whether the cassette is inserted with the flange on the bottom portion or on the top portion.

The indentation has the general shape of the ellipse and in which the elliptical port projecting inwardly towards the bottom wall is substantially half the size of the opening for either the wind or rewind gear. In this fashion the cassette when inserted with the flange down will cause the indentation to engage the wind gear whereas the cassette when inserted with the flange in the upper portion will cause the indentation to catch a portion of the rewind gear.

Further objects and advantages of the present invention will be made more apparent by referring now to the accompanying drawings wherein.

Figure 1:
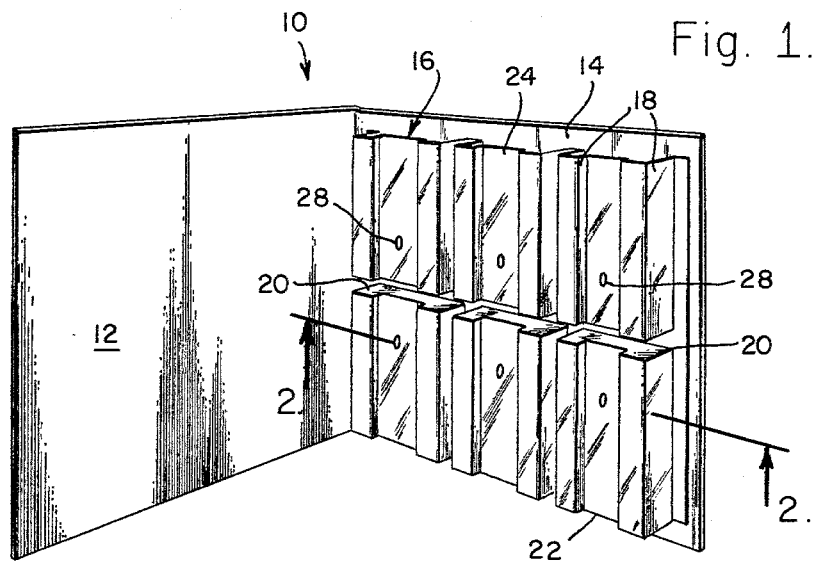
FIG. 1 illustrates an album containing a plurality of cassette holders.

Referring now to FIG. 1, there is shown an album 10 having a pair of opposed sides 12 and 14 which form the front and rear cover of the album.

Located on the inside flat portion of cover 14 is a plurality of identical individual cassette containers 16.

Each of the containers 16 utilize the flat portion of cover 14 as the bottom wall and otherwise comprise identical side walls 18, a single end wall 20, and a preformed top wall 22.

The top wall 22 contains a center portion 24 spaced a given distance from the flat bottom wall 14 but sufficient to allow a cassette to be inserted there between. The top wall 22 also contains a pair of end portions 26 that are spaced a greater distance from the end wall 14 sufficient to allow the outwardly extending flanges on each side of the cassette to be inserted there between.

In other words, the individual cassette can be placed in a first position with the outwardly extending flanges inserted within either of the end portions 26 and the container will still accept the cassette when so inserted.

Located on a center line of the top wall 22 is an indentation 28 located a distance from the end wall 20 equal to the distance that either the wind or rewind gear on the cassette is located from its end position. The indentation 28 is shaped in the form of an ellipse and is formed to project inward towards the bottom wall 14 and is adapted to be inserted in the opening provided in the cassette for either the wind or the rewind gear. In other words, once the cassette is inserted into the container and in either position, the indentation 28 will hold the cassette in the position inserted until the user wishes to remove the cassette from the container.

Figure 2:
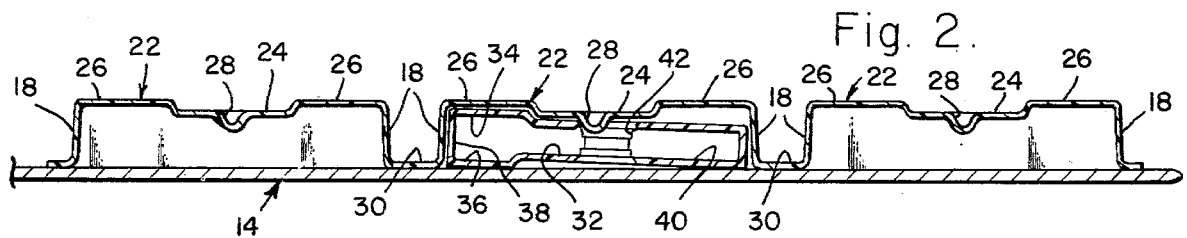
FIG. 2 is a cross-section taken along lines 2—2 of FIG. 1.

Referring now to FIG. 2, there is shown a cross-section taken along lines 2—2 of FIG. 1.

In the preferred embodiment the cassette container is actually molded from a single sheet of plastic having a plurality of identical shaped containers thereon. The assembler simply cuts out that number of containers that he desires for his album which are then seamed onto the album side utilizing one side of the album as the bottommost wall for the cassette containers. The cross-section of FIG. 2 illustrates the continuous line 30 connecting opposing walls 18 to show that the top wall 16 and the end walls 18 and the side walls 20 are all contiguous on a single sheet of plastic.

The centermost container of FIG. 2 illustrates a cassette 32 located within the container. The cassette contains outwardly extending flanges 34 and 36 of one side near the head portion 38 of the cassette. This construction is standard with all cassettes. The opposing side of the cassette 40 is flat and contains the wind and rewind reels for holding the tape. The gear opening 42 provides access to the internal gear for either winding or rewinding the reels located within the cassette 32.

It will be noted that the gear opening 42 is not located on the center line of the cassette but rather is located on one side and away from the head portion 38 of the cassette. The indentation 28 located on the top wall 24 is located on the center line and hence the indentation fits into a portion of the opening 42 regardless of whether the cassette is inserted as shown or is inserted in the reverse position as is more fully illustrated in connection with FIGS. 3 and 4.

Figure 3:
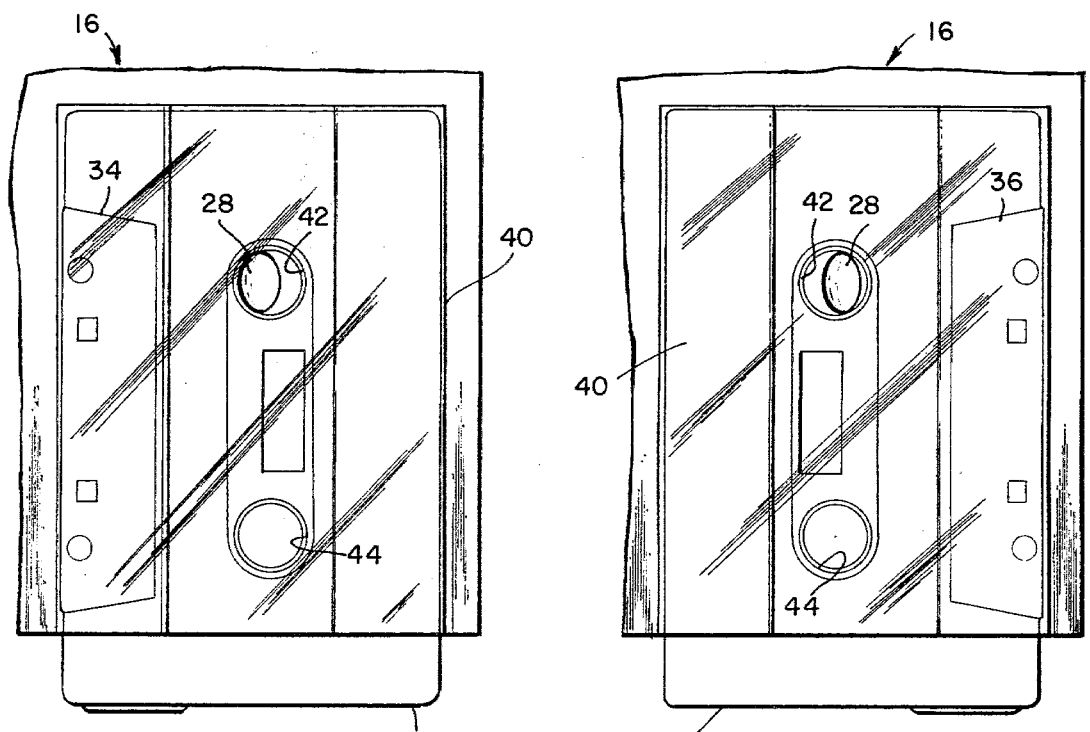
FIG. 3 illustrates the cassette located in the holder in a first direction.

Referring now to FIG. 3, there is shown a top view of the cassette holder constructed according to the principles of this invention with a cassette inserted with the outwardly extending flange 34 located on the left side and in the container 16. It will be noted that indentation 28 located on the topmost cover fills only a portion of the opening 42 of the wind gear. If the cassette 32 was reversed and still located with the embossment of 36 on the left side of the container 16, then indentation 28 would be inserted in a portion of the opening 44 exposing the rewind gear mechanism.

Figure 4:
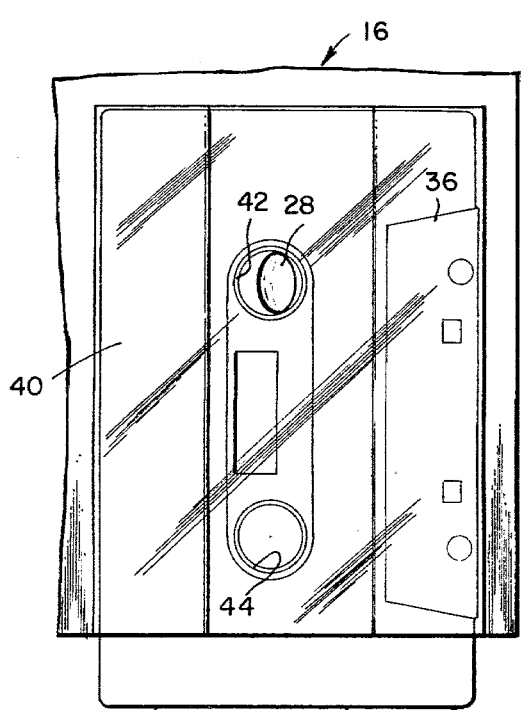
FIG. 4 illustrates a cassette located in the holder in a second position.

Referring now to FIG. 4, there is shown cassette 32 inserted into the container 16 with the outwardly extending flange 36 located to the right of the container. In this position the indentation 28 is now located in the opening for the wind gear 42 but is located more to the right side of the opening whereas in FIG. 3 the indentation 28 was located more to the left side of the opening 42.

It will be apparent, therefore, that by locating the indentation on the center line of the top cover 24 and forming the indentation in the form of an ellipse that it is possible to utilize a single indentation for locking the cassette in position regardless of whether the cassette is inserted in the left or right position in the container 16.

Figure 5:
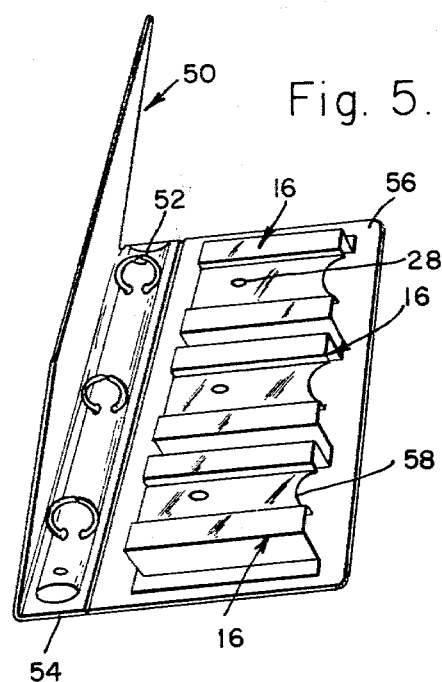
FIG. 5 illustrates a plurality of cassette holders in a ring binder.

Referring now to FIG. 5, there is shown another embodiment of incorporating the containers 16 in combination with a loose-leaf folder 50.

The loose-leaf folder is of a conventional type having controllable metal rings 52 attached to the back portion 54 of the binder 50. Located on one side 56 of the binder 50 is a plurality of containers 16. The containers 16 are in all ways identical to the container 16 described in connection with FIGS. 1 and 2, however, there is included an arcuate cutout 58 on each container to facilitate the removal of the cassette.

The loose-leaf container 50 in combination with the container 16 has found wide applicability when used with course instruction which includes individual cassettes as well as writing material and course instruction. The container 50 allows the student to carry the cassettes in the same container as his course instruction and in all ways use the 3-ring binder in the conventional sense and in a conventional way.

Figure 6:
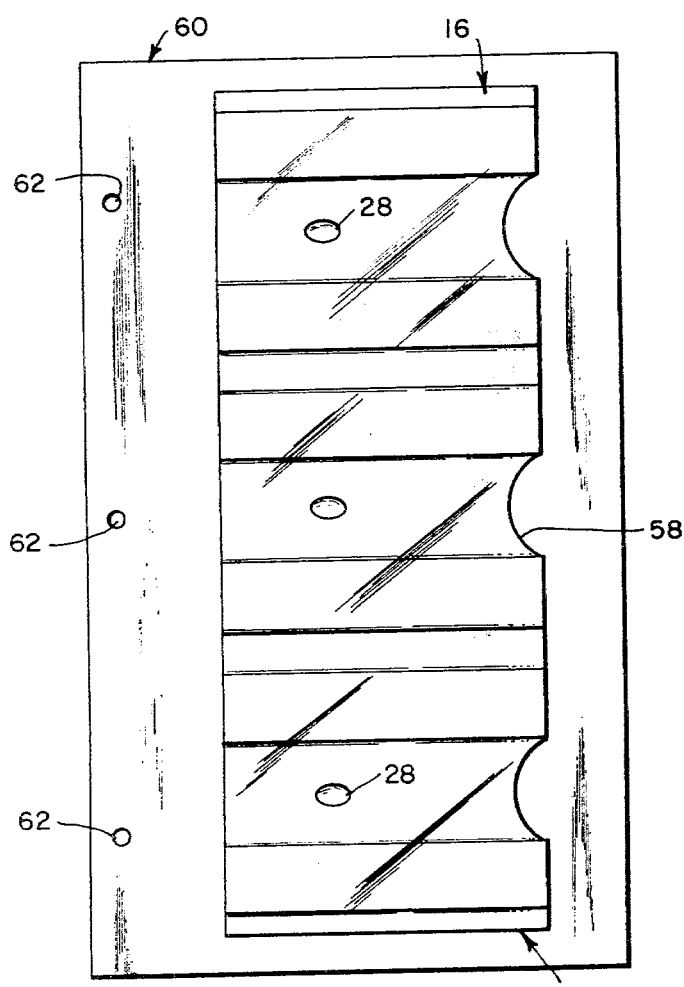
FIG. 6 illustrates a novel holder of cassettes for use with the ring binder illustrated in FIG. 5.
Figure 7:
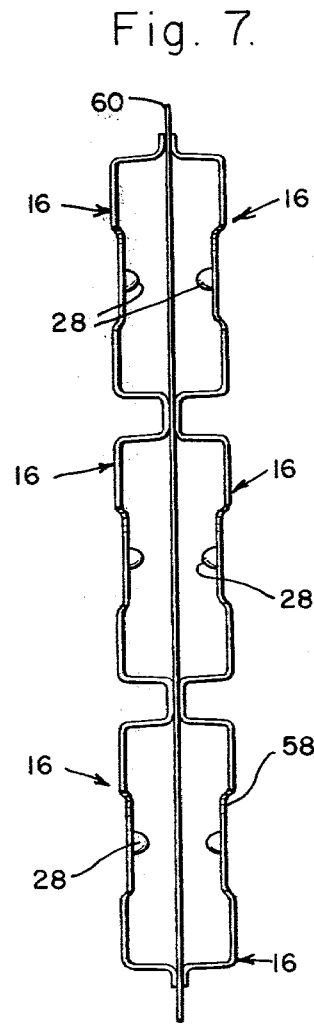
FIG. 7 is a side view of the novel holder illustrated in FIG. 6.

Referring now to FIGS. 6 and 7, there is illustrated what is generally termed an insertable loose-leaf page 60 which is actually a holder for a plurality of cassettes. The loose-leaf page cassette holder 60 is constructed of cardboard or other stiff resilient material and shaped to form the size of a page that would fit into a suitable loose-leaf folder such as that illustrated in FIG. 5. One side of the page 60 contains a plurality of holes 62 adapted to match the binder rings used in a cooperating loose-leaf folder.

A plurality of containers 16 similar to that illustrated in connection with FIGS. 1 and 2 and as modified with the arcuate form 58 as shown in FIG. 5 are attached to each side of the holder page 60.

The embodiment illustrated in connection with FIGS. 6 and 7 was chosen to adapt and conform to the size of a 3-ring folder illustrated in connection with FIG. 5 and as such the holder 60 can hold 3 cassettes on one side of the page and 3 cassettes on the other side of the page. The complete page 60 is then inserted into the 3-ring binder as an addendum should additional cassettes be added to a given course or be needed for the series of lectures being considered.

The cassette holder illustrated in connection with FIG. 6 is not necessarily limited to a 3-ring binder or even to any kind of binder at all, but rather, is intended to illustrate how a plurality of cassettes may be held on a single page and mounted in combination with any other binder or support device. For example, one suggestion has included the use of a hook such is used by merchandisers for displaying ties and socks which will allow the user to hang the cassette holder page 60 from an overhead support as a means of storing his excess cassettes.

It will be appreciated of course that there is no limit to the size of the page 60 and the number of individual containers attached to each side.

I claim:

1. A container for holding a rectangular cassette, said cassette including a pair of wind or unwind gear openings located offset the central line of the length axis of said rectangular cassette, comprising:
   a substantially flat bottom wall without indicia, identical side walls, a single end wall and a preformed top wall for accepting a cassette from an opened end wall whereby the cassette is held on said flat bottom wall,
   said top wall having a center portion spaced a given distance from said bottom wall and a pair of end portions each spaced a greater distance from said bottom wall than said center portion, and at least one indentation located substantially on the center line of the center portion of said top wall,
   said indentation projecting towards said bottom wall and having the general shape of an ellipse whereby said indentation is aligned with one of the openings of the wind or rewind gear of the cassette regardless of the position of the cassette on said flat bottom wall.

2. A container according to claim 1 in which the length of said top wall and said bottom wall is less than the length of a cassette whereby an end portion of the leaning cassette is exposed to facilitate removal of the cassette from the container.

3. A container according to claim 1 in which the indentation is located closer to said single end wall so as to project within the opening located in a cassette for winding or rewinding the tape mechanism for holding said cassette in the container and preventing the winding or the rewinding of the tape mechanism.

4. A container according to claim 3 in which said indentation is sized to fill less than half of the opening provided in the cassette for the wind or rewind gear.

5. A container according to claim 1 wherein the top wall is cut away in an arcuate form to expose a portion of the cassette located outside the container to thereby form an opening to facilitate the removal of the cassette.

6. A booklet containing a pair of flat sided covers and having a plurality of containers for holding and covering a plurality of rectangular cassettes, each said cassette including a pair of wind or unwind gear openings, located offset the central line of the length axis of said rectangular cassette, each said container comprising:
   identical side walls and a single end wall attached to a flat side cover as the bottom wall and attached to a preformed top wall for accepting a cassette from an opened end wall whereby the cassette is held on said flat bottom wall,
   said top wall having a center portion spaced a given distance from said bottom wall and a pair of end portions each spaced a greater distance from said bottom wall than said center portion, and at least one indentation located substantially on the center line of the center portion of said top wall,
   said indentation projecting towards said bottom wall and having the general shape of an ellipse whereby said indentation is aligned with one of the openings of the wind or rewind gear of the cassette regardless of the position of the cassette on said flat bottom wall.

7. A booklet according to claim 6 which includes loose-leaf rings for accepting additional loose-leaf insertable pages.

8. A portable cassette holder for holding a plurality of rectangular cassettes, each cassette including a pair of wind or unwind gear openings located offset the central line of the length axis of said rectangular cassette, comprising:
   a substantially flat reinforced holder without indicia,
   a plurality of cassette containers located on one side of said flat holder,
   each of said containers comprising identical side walls and a single end wall attached to one side of said flat holder as the bottom wall and attached to a preformed top wall,
   said top wall having a center portion spaced a given distance from said bottom wall and a pair of end portions each spaced a greater distance from said bottom wall than said center portion, and
   an indentation located substantially on the center line of the center portion of said top wall,
   said indentation projecting towards said bottom wall and having the general shape of an ellipse whereby said indentation is aligned with one of the openings of the wind of rewind gear of the cassette regardless of the position of the cassette on said flat bottom wall.

9. A portable cassette holder according to claim 8 which includes a plurality of holes located on one side of said flat reinforced holder.

10. A portable cassette holder according to claim 8 which includes a plurality of cassette containers located on each side of said substantially flat reinforced holder.

11. The combination of a container with a rectangular cassette having an outwardly extending flange on each of the end walls substantially on the bottommost portion and having a pair of spaced wind and rewind gear openings located offset the central line of the length axis of said rectangular cassette, said container comprising:

a substantially flat bottom wall without indicia, identical side walls, a single end wall and a preformed top wall for accepting a cassette from an opened end wall whereby the cassette is held on said flat bottom wall, said top wall having a center portion spaced a given distance from said bottom wall to accept the body of a cassette and a pair of end portions each spaced a greater distance from said bottom wall than said center portion for accepting the outwardly extending flanges on the cassette in either position, and at least one indentation located substantially on the center line of the center portion of said top wall, said indentation projecting inward towards said bottom wall for contacting a portion of either said wind or rewind gears and having the general shape of an ellipse whereby said indentation is aligned with one of the openings of the wind or rewind gear of the cassette regardless of the position of the cassette on said flat bottom wall.

12. The combination according to claim 11 in which said cassette is free to slide in and out of the container and the indentation projecting within the opening for the wind or rewind gear is the sole holding means for the cassette.

13. The combination according to claim 11 in which the indentation is sized to fill less than half the opening for the wind or rewind gear.

* * * * *